United States Patent [19]

Ackeret

[11] 4,238,898
[45] Dec. 16, 1980

[54] PICTURE VIEWER
[75] Inventor: Peter Ackeret, Küsnacht, Switzerland
[73] Assignee: Licinvest AG, Chur, Switzerland
[21] Appl. No.: 943,365
[22] Filed: Sep. 18, 1978
[30] Foreign Application Priority Data
Sep. 20, 1977 [DE] Fed. Rep. of Germany ....... 2742346
[51] Int. Cl.³ ........................................... G09F 11/30
[52] U.S. Cl. ...................... 40/513; 40/490; 40/511
[58] Field of Search .............. 40/513, 511, 509, 508, 40/490, 381, 375, 380

[56] References Cited
U.S. PATENT DOCUMENTS

| | | | |
|---|---|---|---|
| 535,635 | 3/1895 | Stone | 40/509 |
| 2,867,051 | 1/1959 | Taylor | 40/509 |
| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |

FOREIGN PATENT DOCUMENTS 173096 7/1906 Fed. Rep. of Germany ............. 40/509

*Primary Examiner*—John F. Pitrelli
*Attorney, Agent, or Firm*—H. Dale Palmatier

[57] ABSTRACT

A picture viewer for displaying, progressively, all of the pictures in a pile of pictures, including a housing with a viewing window, a pile support in the housing beneath the window, leaf springs urging the support toward the window, a spring-disabling control on the housing to disable such springs, a slider to be withdrawn and returned to the housing, a rotary transporter in the housing adjacent the window engaging the top picture in the pile, a driver on the slider to revolve the rotary transporter, and a separator to hold the pile in the housing while the one picture is stripped off and moved out upon withdrawal of the slider, the one picture being pushed back into the housing and under the pile by the slider upon its return, the rotary transporter being non-revolving or spaced from the pile during slider return.

20 Claims, 16 Drawing Figures

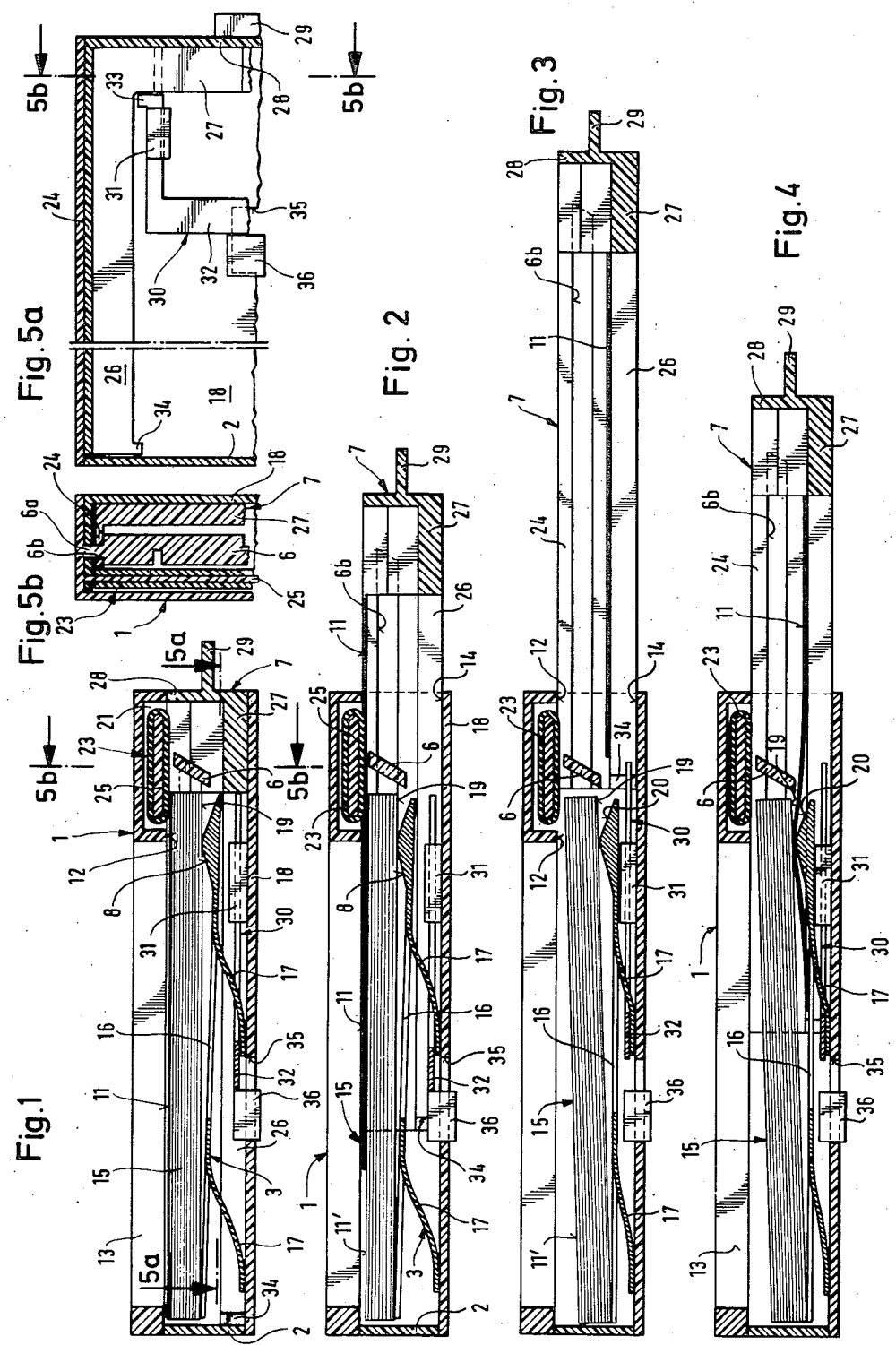

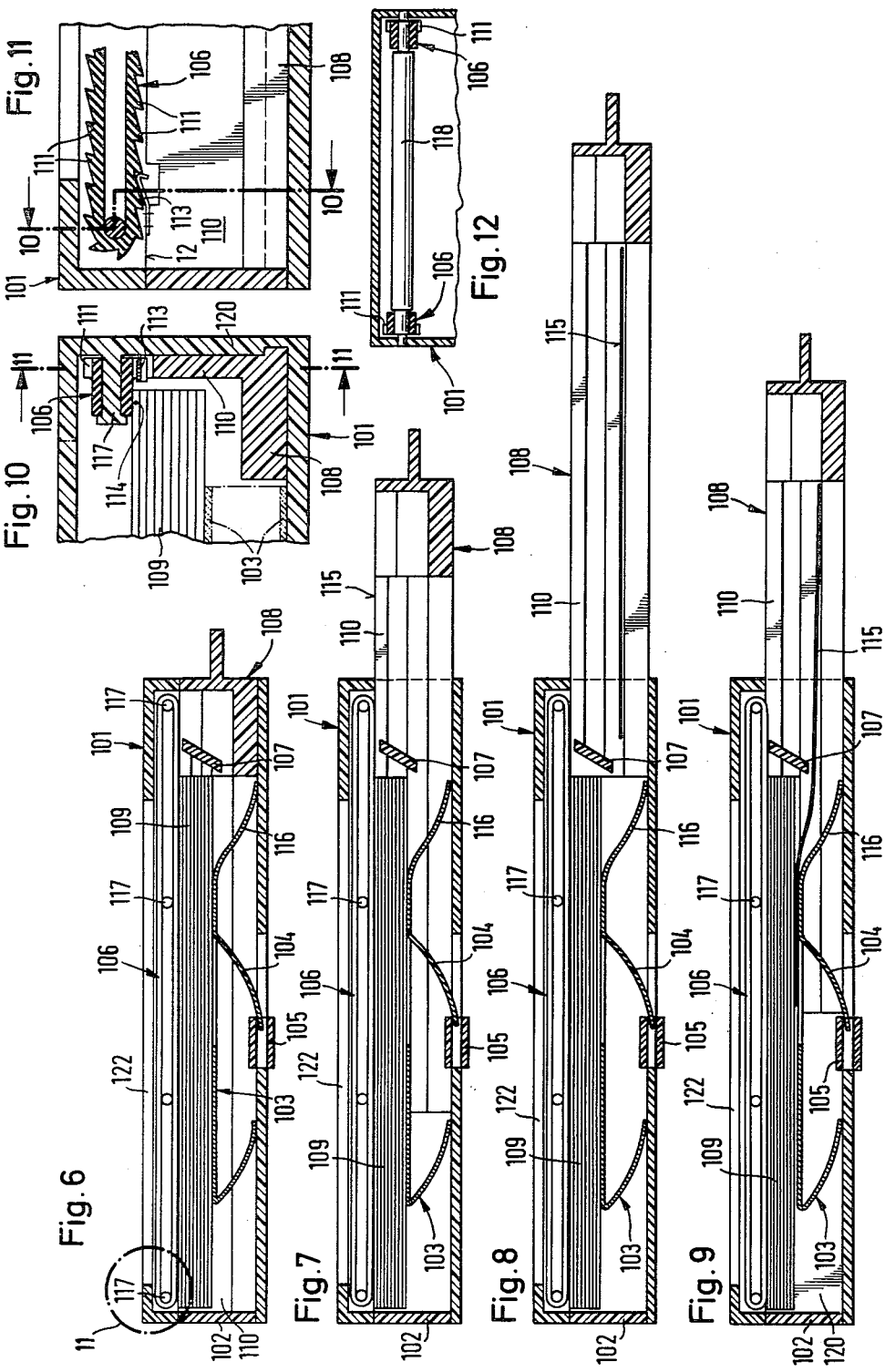

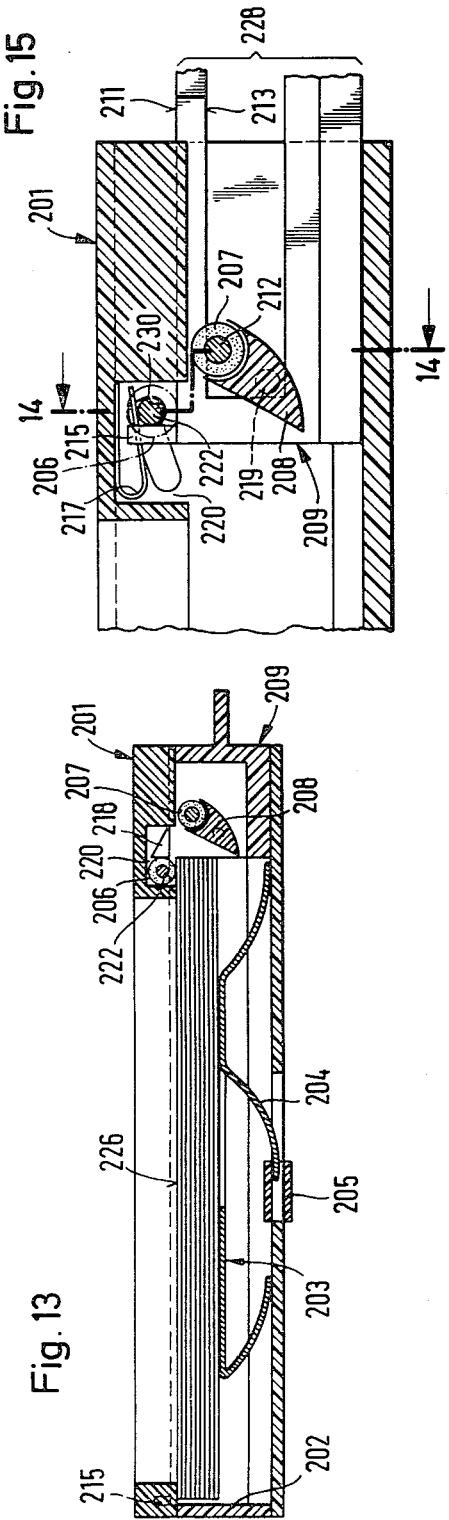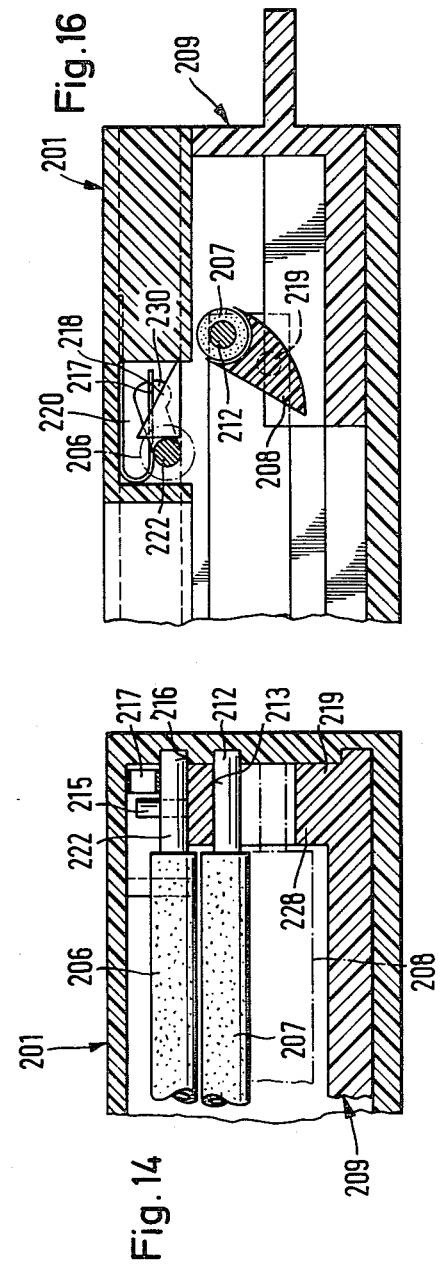

PICTURE VIEWER

The invention relates to a picture viewer carrying a pile of pictures and progressively displaying each individual picture in the pile.

BACKGROUND OF THE INVENTION

A device of this kind is known, for example, from German Patent Specification No. 873,908, but there are also numerous much older and also recent proposals. The following principle of operation is peculiar to them all:

The picture facing the viewing window is taken from the pile of pictures disposed in the housing by the transporter member, in the form of a hook which engages on an edge of the picture, through the upper slot between the housing and a so-called separator, which is the pile support means, since the hook is joined to the slider member. The separator holds back the rest of the pile of pictures. The picture then falls in the slider member to the bottom or is pressed to the bottom by auxiliary springs, and is forced by the slider member, during its return stroke or insertion stroke, through the lower picture slot under the separator, it being pushed between the pressure arrangement and the pile beneath the latter. The picture second from the top now lies against the viewing window for observation, and the operation can, if desired, be repeated.

These designs can be used when the picture thickness is adequate and when the pictures are precisely planar, but not for thin or deformed pictures from which the hook can slide, which not only interferes with the operation but also damages the picture surface and not last also that edge of the picture on which the hook must repeatedly engage. It is presumably for this reason that known devices of this type are not available on the market.

The object of the invention is to create a device of the type having a functionally reliable transporter member that does not damage the pictures.

It must be pointed out that rotatable transporter members in picture viewers are known per se. For example, German Patent Specification No. 864,759 discloses a stereo picture viewer fitted with rubber-coated rollers, in which the rollers are rotated by hand. Consequently it is not possible to change the picture quickly, so that disadvantageously long pauses occur between the individual pictures.

Furthermore, in this case at least two rollers are provided, one of which acts as a drive member while the other conveys the picture out of the viewing position back under the pile, and these rollers are coupled to one another by gear wheels.

SUMMARY OF THE INVENTION

The present invention strips the individual picture off one end of the pile of pictures by a rotary adhesive transporter which may be a roller or rubber belt. The rotary transporter is driven by the slide during withdrawal of the slide.

Driving the rotatable high-friction or adhesive element by means of the slider member produces the difficulty that although the removal of the picture presents no problems, during the return stroke the adhesive elements, which are then being driven in the reverse direction, might catch on the picture then being viewed. Whereas this may possibly be tolerable in the case of framed pictures or very rigid pictures, in a further development of the invention which can be used for all types of pictures, the operating chain comprising slider member, transporter member and pile of pictures, is interrupted at one point during the return stroke of the slider member. This can be effected in a variety of ways: either the drive for the slider member/transporter member can be uncoupled for the return stroke of the distance between the pile of pictures and the transporter member is increased, wherein alternatively the pile is moved away from the stationary adhesive element or the adhesive element is lifted off the stationary pile.

The device may be provided with further modifications, alternatively or in combination, in order to improve its use.

These modifications include pliable support at the back face, means to hang the device as a frame, interchangeable additional frames to be fastened by some means at the front face and having different shapes and surface treatments, the biasing of the slider by means of a spring into its fully opened or fully closed position, the division of the housing wall comprising the window into a multiplicity of windows each one related to a pile of pictures, and another one to a pile of text cards, picture and text eventually being disposed on a common information carrier. Further, the window wall of the housing may be provided with space to permit a user to make notes thereon.

Further, there is the possibility to provide a space within the device, preferably stationary within the housing, to store the negative belonging to the photo disposed in the slider. Finally, the device may be provided at its front and on its rear face with a window each in which case, of course, two different sliders are mounted in parallel.

BRIEF DESCRIPTION OF THE DRAWINGS

Three embodiments are explained in detail in the following with reference to the accompanying drawings.

FIGS. 1–5 relates to the first embodiment in which FIGS. 1–4 are somewhat diagrammatic longitudinal section views through the device in various operating positions of the slider during picture change; FIG. 5a is a detail section view at 5a—5a of FIG. 1; FIG. 5b is a detail section view taken at 5b—5b of FIG. 5a, FIGS. 6–12 are associated with a second embodiment wherein FIGS. 6–9 are somewhat diagrammatic longitudinal section views through the device in various positions of the slider, FIG. 10 is a detail view at 10—10 of FIG. 11, FIG. 11 is a detail section view at 11—11 of FIG. 10, and FIG. 12 is a detail section view of another modified form.

FIGS. 13–16 show a further modified device; FIG. 13 is a somewhat diagrammatic longitudinal section; FIG. 14 is a detail section at 14—14 of FIG. 15; FIG. 15 is an enlarged detail section view with the slider withdrawn; FIG. 16 is a longitudinal section view like FIG. 15, but with the slider returned into the housing.

DETAILED SPECIFICATION

The following features are common to all three embodiments.

The separator is arranged in the housing; in modified embodiments it could alternatively be arranged in the slider member. When the picture is changed the picture facing the viewing window is removed from the pile and pushed back beneath the pile; the reverse sequence is possible without deviating from the proposal of the invention. Changing the complete pile is effected by a separate lid which is arranged opposite the opening of the housing; constructions in which the housing is hinged at the top or at the bottom or in which, for example, by pivoting away the separator the slider member can remove the entire pile, are also possible.

The illustration of the devices in the drawings is limited to the elements required for operation and the drawings are extensively schematicised; they serve merely to explain the basic principles.

The first embodiment (FIGS. 1–5) comprises a housing or frame 1 with a viewing opening or a window 13, which can be closed by a transparent plate. Parallel to the window 13 a slider member 7 can be drawn out of the housing through an aperture 14 in the housing, the movement being limited by stops (not shown). A pile 15 of, for example, twenty pictures, is arranged beneath the window 13, with the picture side facing this window, and is pressed against the frame parts of the housing 1 that surround the window by a pressure arrangement 3 (FIG. 1). The narrow side of the housing 1 on the left in FIGS. 1–4 is closed by a lid 2, which can be snapped on or off and which, when removed, allows the pile 15 to be changed.

The pressure arrangement 3 comprises a pressure plate 16, supported by leaf springs 17 which are secured to the bottom 18 of the housing. The pressure plate has a bulge 8 or is arched to the same effect; so that there is always a gap between the lower edge 19 of the pile facing the slider member and the underlying end edge 20 of the plate 16, into which gap a picture can be inserted (FIGS. 3 and 4).

A separator 6 is fixed in the housing. Above the separator the framework of the housing has an approximately rectangular chamber 21, in which a "journal" 25 having an elliptical cross section is mounted in fixed position, the adhesive element 23 being mounted on this journal. The retentive or adhesive element is a short length of tubing of sandwich construction, of which the inner face facing the journal 25, has a very low coefficient of friction against the material of the journal but of which the outer face exhibits a very high static friction, for example, as a result of rubber-coating both the picture support material (i.e. the paper on the which it is formed) and the material of which the slide member consists. For instance, the tubing of the retentive element 23 may be rubber faced at the outside and coated at the inside with polytetrafluoroethylene (known commercially by its trademark TEFLON), as to easily slide around journal 25. The retentive element is sufficiently pliant as to easily revolve around journal 25 while continuing to bear against the journal.

The arrangement is so designed that the underside (or the "lower run") of the adhesive element 23 is slightly lower than the lower edge 12 of the frame surrounding the window 13, with which frame the upper edge of the lateral bars 24 of the slider member 7 is also flush.

The journal 25 is so long in the direction of movement of slider 7 as to traverse separator 6, such that as the retentive element 23 rotates on the journal 25, the uppermost picture 11 bears upwardly against the retentive element 23 on a part of its surface, and the retentive element extends beyond the separator 6 toward aperture 14 so as also to convey the rear edge of the picture over this separator.

The slider member has a U-shaped outline with lateral arms 26 (FIG. 5), and a transverse arm 27 at the end face as well as lateral bars 24, perpendicular to the lateral arms 26, and an end bar 28 which closes off the housing opening at the front when the slider member is pushed in. The slider member can be pulled out by the handle 29.

Arranged in the region of the bottom of the housing left open by the U-shaped outline of the slider member are the springs 17, already mentioned, as well as a disabling mechanism, the function of which is explained hereinafter. It comprises a rigid control plate 30, guided in guides 31 formed on the bottom 18 of the housing, of which the transverse member 32 in the rest position of the control plate (FIGS. 1 and 2) lies behind the leaf spring 17 that is closer to the housing opening. Lateral projections 33 from the control plate are disposed in the path of movement of the inwardly projecting abutments 34, formed on the lateral arms of the slider member or integral therewith.

The operation of the device is as follows:

In the closed position (FIG. 1), the uppermost picture 11 lies against the lower edge 12 of the window frame. It also lies against the underside of the adhesive element 23, against which in turn—at the side of the pile of pictures 15—the lateral bars 24 lie. When the handle 29 is pulled to the right the slider member rotates the adhesive element as a result of the friction contact, which element is soft enough the retain its shape complementary to the elliptical shape of the journal 25 so that the picture 11 is conveyed out at the speed of the slider member. The friction contact between picture and transporter member is assisted by the pressure arrangement 3.

The separator 6 acts as a stop for the remaining pile, since the gap between separator and adhesive element 23 allows only one picture to pass through (FIG. 2). In the outermost position of the slider member (FIG. 3) the transporter member has moved the picture 11 right over the separator 6.

As the slider 7 is being withdrawn, the abutments 34 have met the projections 33 of the control plate 30 and have pushed the plate toward the housing aperture 14. The transverse member 32 of the control plate slides onto the leaf spring 17 adjacent housing aperture 14 and thereby presses the spring downwards. As a result of the resiliency of the leaf spring 17 the control plate 30 remains clamped in this forward position.

Drawing spring 17 downwardly causes the plate 16 to be drawn down toward the base 18 of the housing such that plate 16 is lower than the upper face of the lateral arm 26 of the slider member, on which arms 26 the picture then rests. This position of plate 16 allows the individual picture 11 then on the arms 26 to be between edge 20 of plate 16 and pile edge 19 when the slider member is moved back.

Return of the slider 7 inwardly of the housing while the plate 16 remains clamped down allows the retentive element 23 to be driven by the slider member in the opposite direction of rotation, and to turn freely without bearing against the now uppermost picture 11' in the pile. The return stroke of the slider member is consequently unhindered until the control plate 30 is pushed back into its starting position by arm 27 moving with slider member 7.

A further guide member 35 is provided in the bottom 18 of the housing for a button 36, with which, even when the slider member is pushed in, the control plate can be pushed from the outside into the disabled position of the pressure arrangement 3, the slider member being, of course, pushed out slightly; this button is operated before the lid 2 is opened so as to change the pile or, in principle when the pictures are not to be changed but are to be filed or dispatched, so as to remove the pressure from them.

The embodiment according to FIGS. 6–12 again have the main elements that were provided in the first embodiment:
Housing 101 with lid 102, a pressure arrangement 103 arranged in the housing for the pile 109 of pictures, the slider member 108, and the separator 107 arranged in the housing. The pressure arrangement 103 comprises an arm 104 projecting down centrally from the housing outlet, the free end of which arm engages in a guide aperture 105. On displacing the button 105 to the right this presses on the upper side of the arm 104, which in turn pulls the entire pressure arrangement 103 downwards.

As can best be seen in the cross-section in FIG. 10, longitudinally extended friction belts 106 parallel to the direction of withdrawal of the slider member are disposed at both sides on side walls 120 of the housing 101, which belts are supported by means of several pins 117. The pins 117 are formed on the side wall 120 of the housing.

The lower runs of the friction belts bear against the uppermost picture 115 of the pile 109 of pictures and press on its outer lateral edges 114. Beyond the pile 115 of pictures, the friction belts have saw teeth 111 which engage a ratchet tooth 113, shaped in or attached to the lateral bar 110 of the slider member 108. The saw teeth 111 are so designed that when the slider member is drawn out, the friction belts 106 are taken along by the ratchet tooth 113 and the division of the teeth is so dimensioned that the withdrawal distance of the slider member is an integral multiple of the teeth pitch so that the slider member, when pushed in, again accurately engages with a tooth of the saw teeth 111. When the slider is pushed in, as in the case of the first embodiment, the rotating transporter element must not contact the topmost picture since this would be damaged or at least placed under severe stress. It is for this reason that saw teeth are used so that the ratchet tooth 113 yields elastically and rides past under the saw teeth.

The uppermost picture 115 is transported over the separator 107 as a result of the fact that the total extension of the friction belts, which here play the part of the transporter elements, extend beyond the separator and the withdrawal path of the slider member is correspondingly longer than the relevant measurement of the pictures.

So that the withdrawn picture 115 is on the return of the slider member introduced under the pile again, the spring of the pressure arrangement 103 has a bulge 116 at the bottom, which is shown in FIG. 9; obviously it is possible in this case to provide slider member-controlled disabling of the spring pressure as in the first embodiment, but this is not shown here. It is possible in this case to make use of the button 105, the purpose of which has already been described above, and which is normally operated only when the lid 102 is to be removed for the purpose of changing the pile.

Unlike the support or bearing of the transporter element 106 on pins 117 according to FIG. 10, it is alternatively possible to provide rotatable pins 118, as indicated schematically in FIG. 12. Obviously such continuous pins can be provided in the housing only covered by the frame of the cut-out viewing portion 122.

Instead of providing teeth on the transporter element it is also possible to provide the slider member with a pure friction engagement by way of a similarly resiliently mounted transporter lever when the varying angles occurring in the withdrawal and insertion direction are taken into consideration accordingly.

In the embodiment according to FIGS. 13–16, it is possible to see again the elements one has become familiar with from the second embodiment: the housing 201 with lid 202, slider member 209, pressure arrangement 203, button 205, arranged in the base, engaging with the middle arm 204 of the pressure arrangement, and separator 208. The operation of these parts therefore need not be explained again.

There is arranged in a chamber 220 a first transporter element 206 in the form of a roller provided with a retentive covering, which with its bearing pins 222 is mounted in an inclined oblique camming groove 216. Transporter or roller 206 has a diameter well in excess of the diameter of drive pin 222 to propel the picture at the top of the pile of pictures at a rate well in excess of the linear speed of the slider 209 as the slider is withdrawn from the housing. In the starting position or closed position according to FIG. 13 the pins 222 of the roller 206 are disposed at the lowest point of the inclined groove 216 and are held in this position by small springs 217 curved in the shape of a U. In this position the circumference of the roller 206 bears against the uppermost picture 226.

If the slider member is now operated, the roller is rotated by the friction contact between the upper edge 211 of the slider member side bar 228 and takes with it the uppermost picture 226 until a pin 215 formed on the rear end of the slider member strikes the roller journals 222 and pushes these forwards and at the same time along the groove 216 upwards, until the journals 222 fall under the action of the spring 217 into a recess 230 and remain there when the slider is pushed back again.

In this manner the transporter element 206, during the return stroke of the slider member, is lifted with respect to the uppermost picture and is thus inactive or disabled. A counter stop 218 close to the handle part of the slider member then pushes the transporter element 206 back out of the recess 230 so that it can roll back along the inclined groove 216 down into the starting position, assisted by the spring 217.

When the uppermost picture 226 has passed between the remainder of the pile and the transporter element 206, it is no longer driven by the latter and would remain between the separator 208 and the upper side of the housing if further transport were not provided by a second transporter element 207. This transporter element is a roller provided with an adhesive covering, similar to the transporter element 206, which roller 207 cannot, however, be disengaged from its drive; the drive is provided by the underside of the bar 213 of the slider member lateral bars 228. The distance between the bar 213 and the base part of the bar 228 is large enough for it to be possible not only for the second transporter element 207 to be mounted here but also for the fastening means 219 of the separator 208 to extend through the slot and be fixed in the housing 201.

The second driven transporter element 207 conveys the uppermost picture 226 right over the separator 208, after which it falls down or is pressed down by auxiliary springs and is pushed under the separator back under the pile, as in the second embodiment. The disengagement of the second transporter roller 207 is not necessary since it can rotate smoothly in the opposite direction when there is no picture clamped between the separator 208 and the upper side of the housing.

Changing the pile by removing the lid 202 with the pressure arrangement 203 moved down is effected as in the second embodiment.

It is also pointed out that between the slider member and the rotating transporter on the one hand, and the transporter and the picture to be driven on the other hand, a gear transmission may be provided in such a manner that the picture is given a higher linear speed than the slider member itself, so that the slider member can be of minimum length and nevertheless the picture is completely removed from the pile and conveyed past the separator. This is clearly visible in FIG. 14 but applies equally to the other embodiments. There are equivalent means to obtain such operation: Supplementary acceleration of the one picture by, say, a spring biased by the slider member, or auxiliary transporter means, as a hook or the like, subjected to a high transmission ratio and acting but across the last portion of the picture path.

Furthermore it is not absolutely necessary for the separator to support the pile at the end face. A lateral friction-contact support can alternatively be provided for the pile.

The withdrawal of the slider member can be used to tension a spring arranged in the housing which then pulls the spring back again, or conversely the slider member may be under spring pressure and be triggered by a button or the like, while the spring is retensioned during insertion of the slider member.

Finally, it is also not essential for the transporter element to be arranged in the housing. If the slider member is so formed that it takes the entire pile out with it, the transporter element could be arranged on the slider member and be driven in counter-rotation in such a manner, for example by friction contact with the housing, that the one picture to be held back is held in the housing.

It will be understood that the transporter must be designed such that it will at first engage the adjacent picture, i.e. it must engage before the separator. On the other hand, the transporter must convey the picture beyond the separator and thus be active up to this point at least. In the embodiments described so far, this problem was solved by provision of a roller in front and behind the separator or of a tape conveyor extending over the separator. A further design would involve groove guides extending across the separator and a roller moveable along said grooves and blocked against rotation during such longitudinal movement but rotatably driven by the slider member at the end of the groove where the blocking is released. Therefore, the picture is picked up by the roller and transported a first path by frictional engagement without rolling action and further moved by rotation of the roller. The roller shaft may be rectangular adapted to the slot configuration, the slot having beyond the separator, a widened circular shape apt to serve as a bearing for the square roller shaft end.

What is claimed is:

1. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment to contain the pile of pictures and having first and second ends, one end of the compartment being adjacent the window through which a picture at one end of the pile is displayed, a picture changing mechanism adjacent the picture compartment and presenting a displayed picture to the window, the picture changing mechanism moving the displayed picture away from the window and into the pile and removing a new picture off one end of the pile and moving the new picture to the window for display in response to such relative observe and reverse movement of the frame and slider, said picture changing mechanism including a pile transporter, and an individual picture transporter on the frame and movable therewith, the pile transporter being disposed at one side of the compartment to engage one side of the pile of pictures, the individual picture transporter being disposed at a first end of the compartment to engage an individual picture at the corresponding end of the pile of pictures, spring means at the second end of the compartment and urging the pile of pictures toward said individual picture transporter, the individual picture transporter having a rotary driver with a retentive driving surface confronting the end of the compartment to engage the face of the individual picture at the end of the pile, and driving means connected with the rotary driver and the slider and rotating said driver in response to sliding movement of the slider relative to the frame.

2. A picture viewer according to claim 1, and disabling means disabling the driving means between the driver and slider, the rotary driver of the high friction element is uncoupled during the reverse relative movement of slider and frame.

3. A picture viewer according to claim 1, said driving means including a gear transmission producing a lineal speed at the retentive driving surface and individual picture in excess of the relative lineal speed between frame and slider.

4. A picture viewer according to claim 1, wherein the rotary driver is in the form of an endless flat belt at the side of the compartment and traversing the edge of the picture at the end of the pile.

5. The picture viewer according to claim 1, and the slider member being biased into its outermost or innermost position with respect to the frame by a spring.

6. A picture viewer according to claim 1, and the frame having two or more windows, an additional slider, each slider being adjacent a respective window.

7. A picture viewer according to claim 1, wherein the window is divided into at least two individual window portions for common or separate pictures.

8. A picture viewer according to claim 1, and an additional compartment on the frame to receive negative film strips belonging to photographic positive pictures in the pile.

9. A picture viewer according to claim 1, wherein the rotary driver is a roller with an adhesive surface movable with the slider member along groove guides where it is blocked against rotation, and that the blocking is released at the end of the groove guides.

10. The picture viewer according to claim 1, and disabling means responding to relative reverse movement between frame and slider and increasing the spacing between the rotary driver and the spring means.

11. The picture viewer according to claim 10, wherein the disabling means engages and disables the spring means to relieve pressure between the pile and the rotary driver.

12. The picture viewer according to claim 11, wherein the disabling means includes cooperating control elements on the spring means and slider and operating to disable the spring means in response to relative movement of the frame and slider.

13. A picture viewer according to claim 10 or 11 or 12, and manually operable means on the frame and disabling said spring means from applying pressure on the pile of pictures and independently of relative movement of frame and slider.

14. A picture viewer according to claim 10, and means swingably mounting the rotary driver on the frame for swinging movement away from the end of the compartment and the pile during the relative reverse movement between frame and slider.

15. A picture viewer according to claim 14, and means on the slider effecting such swinging movement of the rotary driver in response to such relative reverse movement between frame and slider.

16. A picture viewer according to one of claims 1, 10–12 and 9–11, and said pile transporter being on the slider for moving the entire pile away from the window.

17. A picture viewer according to one of claims 1, 10, 2, 14 and 15, wherein the rotary driver comprises a first roller driven by the slider member only during the relative obverse movement between frame and slider and thereby engaging the uppermost picture in the pile, and comprises a second roller rotatably driven by the slider member during both the relative obverse and reverse movement between the frame and slider, the first roller adjoining the compartment and the second roller being spaced from the first roller along the path of picture movement.

18. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment to contain the pile of pictures and having first and second ends, one end of the compartment being adjacent the window through which a picture at one end of the pile is displayed, a picture changing mechanism adjacent the picture compartment and presenting a displayed picture to the window, the picture changing mechanism moving the displayed picture away from the window and into the pile and removing a new picture off one end of the pile and moving the new picture to the window for display in response to such relative obverse and reverse movement of the frame and slider, said picture changing mechanism including a pile transporter, and an individual picture transporter on the frame and movable therewith, the pile transporter being disposed at one side of the compartment to engage one side of the pile of pictures, the individual picture transporter being disposed at a first end of the compartment to engage an individual picture at the corresponding end of the pile of pictures, spring means at the second end of the compartment and urging the pile of pictures toward said individual picture transporter, the individual picture transporter having a rotary driver with a retentive driving surface confronting the end of the compartment to engage the face of the individual picture at the end of the pile, driving means connected with the rotary driver and the slider and rotating said driver in response to relative obverse sliding movement of the slider relative to the frame, and disabling means having connection with the rotary driver and spring means and producing relative diverging movement between the rotary driver and the spring means to produce disengagement between the retentive driving surface and the face of the individual picture at the end of the pile in response to relative reverse movement of the frame and slider.

19. The picture viewer according to claim 18, wherein said disabling means includes camming means acting upon said spring means and withdrawing the spring means in a direction away from the rotary driver.

20. The picture viewer according to claim 18, wherein said disabling means includes stop means limiting movement of the pile of pictures toward the rotary driver, and cam means moving the rotary driver away from the end of the compartment and away from said spring means to produce disengagement between the retentive driving surface of the rotary driver and the face of the individual picture at the end of the pile.

* * * * *